Oct. 30, 1934.    S. R. RAMSAY    1,978,761
DOOR SEAL
Filed Dec. 26, 1930
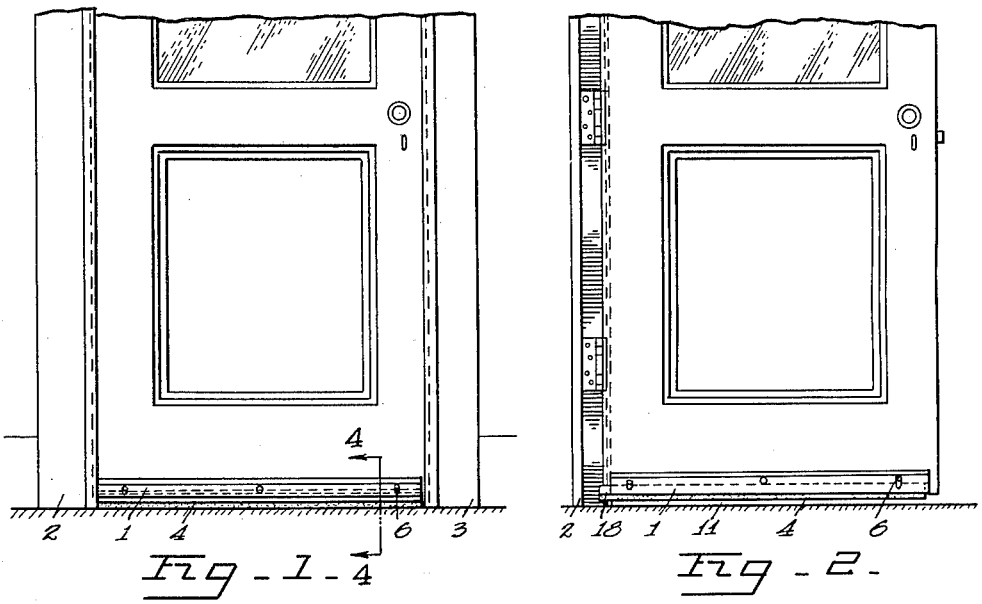
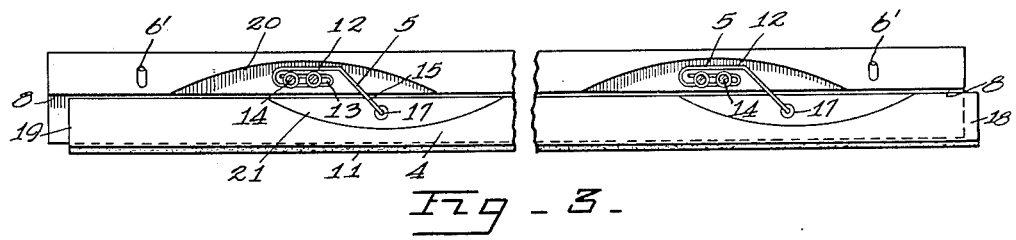
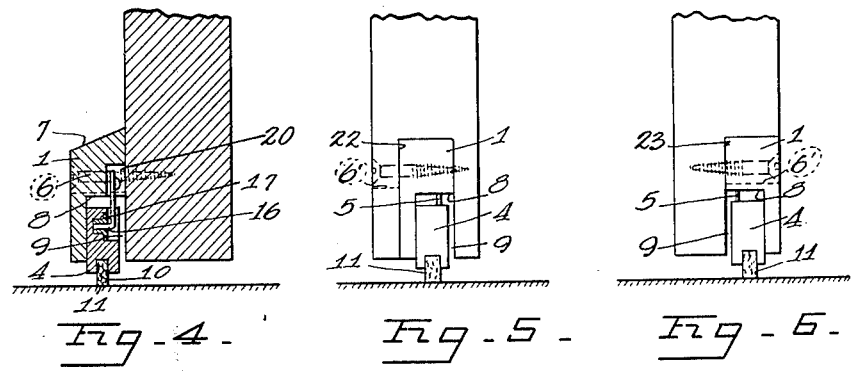
INVENTOR.
SAMUEL ROBERT RAMSAY
BY Munn & Co.
ATTORNEYS.

Patented Oct. 30, 1934

1,978,761

UNITED STATES PATENT OFFICE 1,978,761

DOOR SEAL

Samuel Robert Ramsay, Santa Cruz, Calif.

Application December 26, 1930, Serial No. 504,941

2 Claims. (Cl. 20—68)

The present invention relates to improvements in door seals over my co-pending application, Serial No. 398,048, filed October 7, 1929, and it consists in the combinations, constructions and arrangements hereinafter described and claimed.

In my co-pending application, I provide a weather strip for a door or the like that will automatically move from active to inactive position or vice versa as the door is opened or closed. This strip is utilized for forming a closure between the bottom of the door and the floor when the door is closed so as to prevent draft from entering the room on which the door opens. The weather strip further prevents rain from beating under the door, and the strip is automatically raised so as to lie flush with the bottom of the door when the latter is opened.

In the present invention I propose to provide a weather strip assembly containing a support strip and a sealing strip associated therewith, and being particularly adapted for fastening to the door as a unit, which at the same time is constructed in such a manner that the supporting strip protects the major portion of the sealing strip from the influence of the weather.

It is further proposed in the present invention to provide means for allowing the entire assembly to be adjusted with respect to the door on which it is applied.

Further objects and advantages of my invention will appear as the specification proceeds.

The preferred form of my invention is illustrated in the accompanying drawing, in which Figure 1 shows an outside view of a closed door having my weather strip attached thereto, the weather strip being shown in active position, Figure 2 a front view of the same door in open position showing the weather strip inactive so as to clear an interposed rug or the like, Figure 3 an inside elevation of the weather strip, Figure 4 a vertical section taken along line 4—4 of Figure 1, Figure 5 an end view of the lower portion of a door having my weather strip accommodated in a groove within the door, and Figure 6 a similar view showing my weather strip mounted in a recess in the door.

While I have shown only the preferred forms of my invention, I wish to have it understood that various changes or modifications may be made within the scope of the claims hereto attached without departing from the spirit of the invention.

In its preferred form my invention comprises a supporting strip 1 substantially co-extensive in length with the width of the door opening as measured between the two casings 2 and 3, a sealing strip 4 of substantially the same length and spring means 5 for securing the sealing strip to the supporting strip.

The supporting strip may be fastened to the door by means of screws 6 in such a manner that its bottom is substantially flush with the bottom edge of the door and the upper edge of the supporting strip is preferably beveled as shown at 7 for shedding the rain and for enhancing the appearance of the assembled device. The screws 6 are passed through slots 6' in the supporting strip, and this allows the latter to be adjusted with respect to the door. The inner face of the supporting strip is recessed throughout its lower section so as to form a straight ledge 8 extending from end to end, in which the weather strip 4 may be accommodated. It will be noted that the recess is coextensive in width with the width of the sealing strip so that when the latter is held in contact with the bottom of the recess and the ledge, the lower edge of the sealing strip is flush with the bottom edge of the supporting strip and that of the door. The thickness or depth of the sealing strip is slightly less than that of the ledge so that a certain amount of space indicated at 9 is left between the sealing strip and the face of the door.

The sealing strip itself is grooved in the bottom as shown at 10 to accommodate a strip of felt shown at 11, which projects slightly beyond the sealing strip. The felt strip is preferably glued into the sealing strip and dried thereafter for about thirty-six hours, and in order to make the entire sealing strip weather proof, the same is saturated, after the glue has dried, in paraffine at a high temperature, preferably 212 deg. Fahrenheit.

The spring means for securing the sealing strip to the supporting strip comprise preferably two spring wires 12 of the same construction, each being bent and re-bent at one end to provide a slot 13 which allows screws 14 to pass therethrough into the supporting strip. It will be noted that in this manner each spring is capable of end-wise adjustment relative to the supporting strip. Each wire is bent downward at 15 to project in inclined direction over the sealing strip and is bent again at its extreme end as at 16 to enter a socket 17 provided in the sealing strip. The tension of each spring is such that the sealing strip normally is urged into intimate contact with the face and the edge of the ledge and the sealing strip is projected end-wise to slightly extend beyond one end of the supporting strip as shown at 18, while its other end 19 is correspondingly retracted. For accommodating the spring means the supporting strip and the sealing strip are formed with corresponding recesses 20 and 21.

The manner of using my weather strip will be readily understood from the foregoing description. The entire weather strip is first assembled as shown in Figure 3, in which form it is preferably placed on the market, and is then fastened to the closed door by means of the screws 6 in such a manner that the weather strip fills the door opening between the casing members 2 and 3, whereby the sealing strip is forced to recede on the ledge so that its end edges are flush with the end edges of the supporting strip. The sealing strip can only adopt this position by swinging downward so that the felt strip comes in close contact with the floor underneath the door and effectively seals the space between the door and the floor. When the door is opened the sealing strip is released from the pressure of the casing member and is allowed to project outward to assume the position illustrated in Figures 2 and 3, in which the sealing strip is raised so as to clear a rug or carpet lying on the floor.

In Figure 5 the weather strip of Figure 3 slightly modified is shown as being accommodated in a groove 22 formed in the door, and in Figure 6 the same weather strip is shown as being mounted in a recess 23 formed in the face of the door.

It will be noted that in this manner the weather strip is automatically actuated by operation of the door, the sealing strip being forced downward when its end 18 strikes the casing in closing the door, and being forced upward as soon as its end 18 loses contact with the door casing when the door is opened. It should be understood that my weather strip may be applied to inside doors as well as outside doors, to casement windows, refrigerator doors, etc. and may be applied to the top as well as to the bottom of the door.

I claim:

1. A weather strip for a door or the like comprising a supporting strip adapted for fastening to the door and formed with a ledge, a sealing strip adapted to ride on the ledge and springs mounted on the supporting strip and engaging the sealing strip for urging the same to the ledge and endwise beyond the same, each spring having a horizontal slot and a pair of horizontally alined screws passing through the slot for fastening the same to the supporting strip with freedom of endwise adjustability.

2. Spring means for mounting a sealing strip on a support comprising a spring wire bent at one end to form a slot of sufficient length to receive a pair of screws therein in horizontal alinement and to allow of horizontal adjustment of the spring, the spring wire being bent intermediate its length to project over the sealing strip and being turned at its extremity for entering a socket formed in the sealing strip.

SAMUEL ROBERT RAMSAY.